United States Patent
Yamaguchi

(10) Patent No.: US 8,457,687 B2
(45) Date of Patent: Jun. 4, 2013

(54) RADIO COMMUNICATION DEVICE, RADIO COMMUNICATION SYSTEM, METHOD FOR RADIO COMMUNICATION AND PROGRAM THEREOF

(75) Inventor: Yuki Yamaguchi, Shizuoka (JP)

(73) Assignee: NEC Access Technica, Ltd., Shizuoka (JP)

( * ) Notice: Subject to any disclaimer, the term of this patent is extended or adjusted under 35 U.S.C. 154(b) by 1139 days.

(21) Appl. No.: 12/021,540

(22) Filed: Jan. 29, 2008

(65) Prior Publication Data

US 2008/0261550 A1 Oct. 23, 2008

(30) Foreign Application Priority Data

Feb. 22, 2007 (JP) .................................. 2007-41972

(51) Int. Cl.
*H04M 1/00* (2006.01)
(52) U.S. Cl.
USPC ......................................... 455/562.1; 455/69
(58) Field of Classification Search
USPC .................. 455/562.1, 69, 561, 63.4; 343/702
See application file for complete search history.

(56) References Cited

U.S. PATENT DOCUMENTS

| 2005/0003865 A1* | 1/2005 | Lastinger et al. | 455/562.1 |
| 2007/0197180 A1* | 8/2007 | McKinzie et al. | 455/248.1 |
| 2008/0248769 A1* | 10/2008 | Kondo et al. | 455/161.2 |

FOREIGN PATENT DOCUMENTS

| JP | 2006014027 A | 1/2006 |
| JP | 2006115414 A | 4/2006 |
| JP | 2006246172 A | 9/2006 |
| JP | 2006295282 A | 10/2006 |
| JP | 2007104637 A | 4/2007 |

OTHER PUBLICATIONS

Japanese Office Action issued Mar. 11, 2009 for JP Application No. 2007-041972.

* cited by examiner

*Primary Examiner* — Lewis West

(57) ABSTRACT

A radio communication device according to an exemplary aspect of the present invention which communicates in a form of multi data streams can reduce antennas which become useless in communication with a radio communication device which communicates in a form of one data stream, and can improve transmission characteristic in communication with a radio communication device which communicates in the form of one data stream. Therefore, an antenna which is not used is used for selective diversity receiving. Moreover, an antenna which is not used is moved near an antenna which is used for communication, to keep a transmission state stable.

6 Claims, 8 Drawing Sheets

RADIO COMMUNICATION DEVICE, RADIO COMMUNICATION SYSTEM, METHOD FOR RADIO COMMUNICATION AND PROGRAM THEREOF

RELATED APPLICATIONS

This application is based on Japanese Patent Application No. JP 2007-041972 filed on Feb. 22, 2007, and including a specification, claims, drawings and summary. The disclosure of the above Japanese Patent Application is incorporated herein by reference in its entirety.

BACKGROUND OF THE INVENTION

1. Field of the Invention

The present invention relates to a technology of radio communication and in particular, relates to a radio communication technology in which a radio communication device having a plurality of antennas communicates with a radio communication device having one antenna.

2. Description of the Related Art

In recent years, a high-speed radio communication device installing a MIMO (Multiple-Input Multiple-Output) technique which can dramatically increase transmission capacity appeared. In the MIMO technique, a plurality of transmitting and receiving antennas are utilized. Each antenna transmits a different signal (data). Thus, the MIMO technique performs parallel transmission through transmitting a plurality of data streams. Therefore, the high-speed radio communication device installing the MIMO technique can perform multiplex communication by the parallel transmission. As a result, the high-speed radio communication device installing the MIMO technique can increase transmission capacity. At this moment, a small number of the high-speed radio communication devices installing the MIMO technique are utilized in a market of the radio communication device. The MIMO technique is compatible with a technique by which communication is achieved in a form of one data stream (IEEE802.11a, IEEE802.11g and IEEE802.11b). Therefore, the high-speed radio communication devices installing the MIMO technique and radio communication devices which communicate in the form of one data stream interoperate in a radio communication system (For example, Japanese Patent Application Laid-Open No. 2006-014027).

FIG. 1 is a system configuration diagram according to a related art. In FIG. 1, a radio communication device which communicates in a form of one data stream and a high-speed radio communication device installing a MIMO technique are interoperate.

With reference to FIG. 1, a wireless LAN device 10 includes three antennas for transmitting and receiving. The wireless LAN device 10 can transmit and receive data in a form of three data streams via the three antennas. That is, the wireless LAN device 10 can communicate according to the MIMO technique. Antennas 11-1 to 11-3 are transmitting and receiving antennas which are mounted in the wireless LAN device 10.

A wireless LAN device 12 transmits and receives data in the form of one data stream. That is, the wireless LAN device 12 communicates in the form of one data stream without the MIMO method. An antenna 13 is a transmitting and receiving antenna which is mounted in the wireless LAN device 12.

In a configuration mentioned above, the wireless LAN device 10 communicates in the form of one data stream via one predetermined antenna of the three antennas. Meanwhile, other antennas are not used for communication in the form of one data stream. In FIG. 1, the wireless LAN device 10 communicates with the wireless LAN device 12 in the form of one data stream. That is, the antennas 11-1 and the antenna 13 are used for communication. According to the communication mentioned above, antennas 11-2 and 11-3 are not used for communication at all and consequently, they become useless. Moreover, the antennas 11-2 and 11-3, which are useless for communication, cause a change of radio transmission characteristic of the antenna 11-1 due to the antennas 11-2 and 11-3 being arranged near the antenna 11-1. And the change of the radio transmission characteristic of antenna 11-1 causes bad influence on the radio transmission between the antenna 11-1 of the wireless LAN device 10 and the antenna 13 of the wireless LAN device 12.

SUMMARY OF THE INVENTION

The present invention was made to solve the foregoing and other exemplary problems, drawbacks, and disadvantages.

A first exemplary feature of the present invention is to provide a radio communication device, which communicates in a form of multi data streams and can reduce antennas which become useless in communication with a radio communication device which communicates in a form of one data stream.

A second exemplary feature of the present invention is to provide a radio communication device which communicates in the form of multi data streams and can improve transmission characteristic in communication with a radio communication device which communicates in the form of one data stream.

A radio communication device according to an exemplary aspect of the present invention includes a plurality of antennas and a control unit. When an opposite communication device is a radio communication device which communicates through combining a plurality of antennas, the control unit controls communication through combining a plurality of antennas of the radio communication device. Moreover, when an opposite communication device is a radio communication device which communicates via one antenna, the control unit controls an antenna which is not used for communication and consequently, secures stable transmission characteristics of an antenna which is used for communication.

A radio communication system according to an exemplary aspect of the present invention includes a first radio communication device which transmits information on a communication mode of the first radio communication device, and a second radio communication device which receives the transmitted information on the communication mode above mentioned. When the above mentioned information on the communication mode indicates that the first radio communication device communicates through combining a plurality of antennas, the second radio communication device communicates through combining a plurality of antennas. Moreover, when the above mentioned information on the communication mode indicates that the first radio communication device communicates via one antenna, the second radio communication device secures the stable transmission characteristics of one antenna, which is used for communication, through controlling an antenna which is not used for communication. When an opposite communication device is a radio communication device which communicates through combining a plurality of antennas, software of the radio communication device of the present invention controls the radio communication device to communicate through combining a plurality of antennas of the radio communication device. Moreover, when an opposite device is a radio communication device which communicates via one antenna, the software of the radio communication device controls the radio communication device to secure the stable transmission characteristics of one antenna, which is used for communication, through controlling an antenna which is not used for communication among a plurality of antennas.

The following effects according to an exemplary aspect of the present invention are secured when a communication device, which communicates via a plurality of antennas like a MIMO technique, communicates with a communication device which communicates via one antenna.

That is, an antenna, which is not used according to a related art, is used for selective diversity receiving according to the present invention and consequently, it is possible to improve transmission characteristics of an antenna and to keep a transmission state stable.

Moreover, an antenna, which is not used according to a related art, can be moved near an antenna which is used for communication, to generate frequency resonance, improve transmission characteristics of the antennas and keep a transmission state stable.

Other exemplary features and advantages of the present invention will be apparent from the following description taken in conjunction with the accompanying drawings, in which like reference characters designate the same or similar parts throughout the figures thereof.

BRIEF DESCRIPTION OF THE DRAWINGS

Exemplary features and advantages of the present invention will become apparent from the following detailed description when taken with the accompanying drawings in which.

DETAILED DESCRIPTION OF THE EXEMPLARY EMBODIMENTS

Exemplary embodiments of the present invention will now be described in detail in accordance with the accompanying drawings.

A radio communication system of the exemplary embodiment includes, for example, a wireless LAN device which operates as a radio communication device. The radio communication system includes a wireless LAN device which communicates via a plurality of antennas like a MIMO technique and a wireless LAN device which communicates via one antenna like a SISO (Single-in Single-out) technique. In the system of the present invention, the wireless LAN device having a plurality of antennas communicates with the wireless LAN device having one antenna. The exemplary embodiment discloses that an antenna which is not used for communication is utilized for selective diversity receiving in order to stabilize and improve a communicating condition. Further, when the wireless LAN devices communicate with each other in a form of multi data streams, they communicate according to the MIMO technique.

The exemplary embodiment will be described below in detail with reference to drawings.

A first exemplary embodiment of the present invention will be described in detail with reference to drawings.

Figure 1:
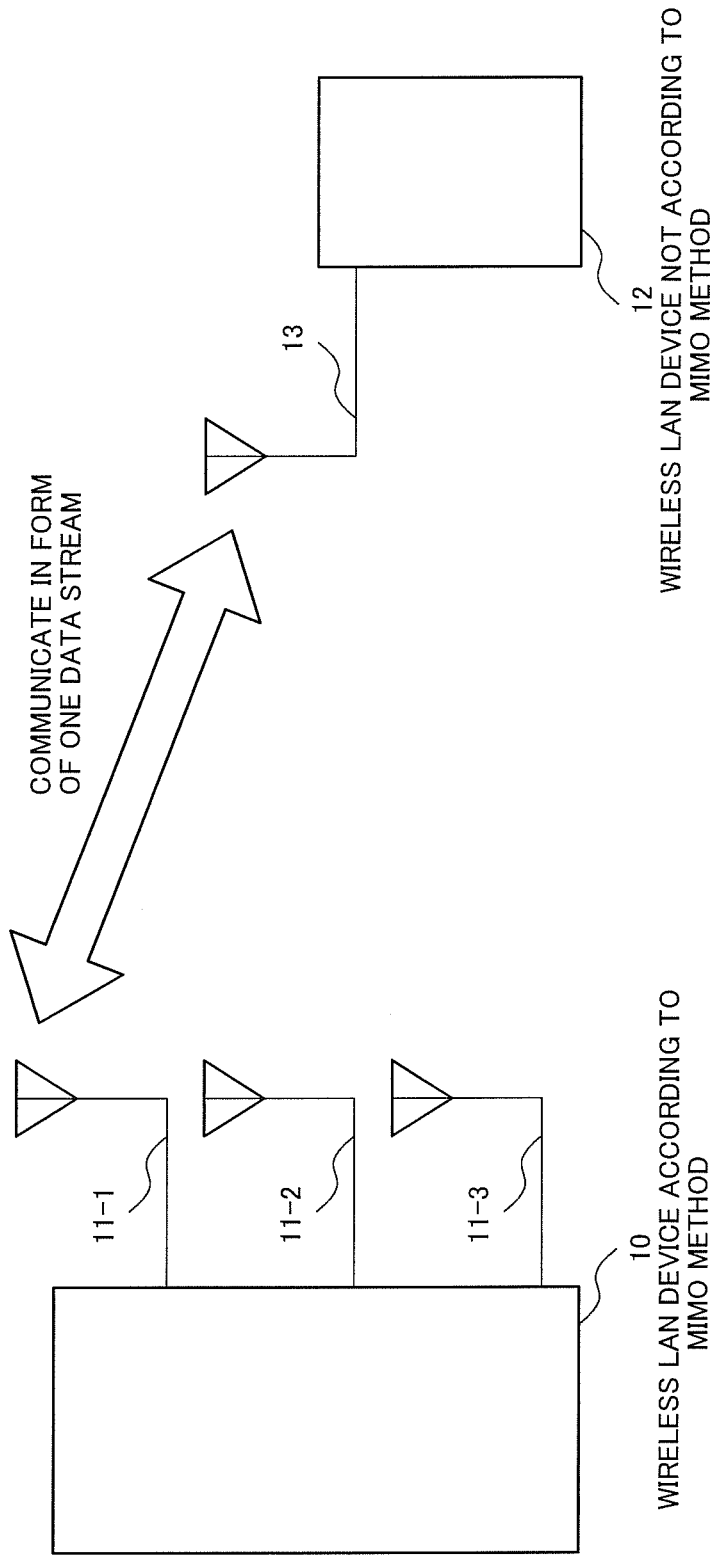
FIG. 1 is a system configuration diagram to describe a related art.
Figure 2:
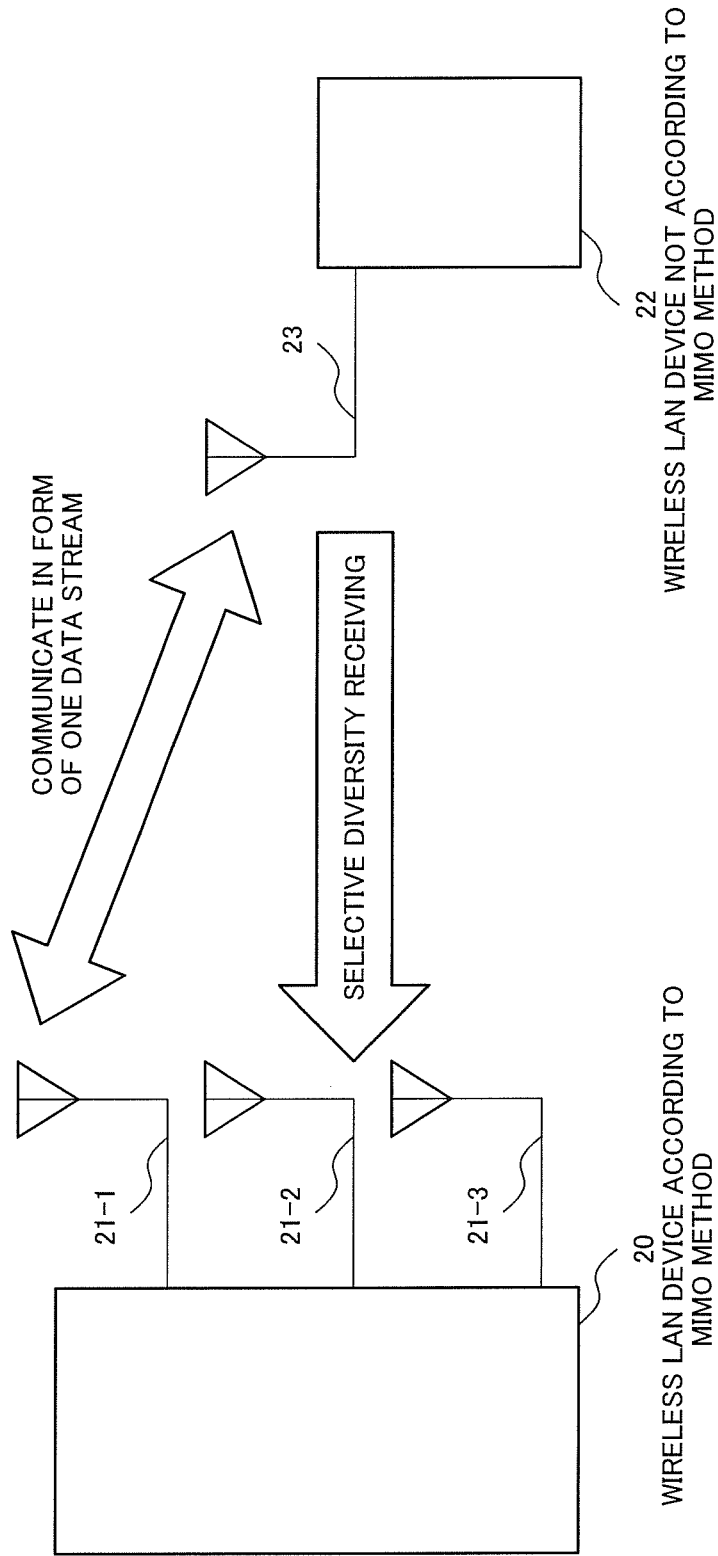
FIG. 2 is a system configuration diagram according to a first exemplary embodiment of the present invention.

FIG. 2 is a system configuration diagram showing a radio communication system according to the first exemplary embodiment of present invention.

The radio communication system includes wireless LAN devices 20 and 22. Further, the radio communication system may include more than two wireless LAN devices. However, in order to simplify descriptions, a configuration including the wireless LAN devices 20 and 22 will be exemplified below.

In FIG. 2, the wireless LAN device 20 includes three antennas and three radio circuits and transmits/receives different data through a plurality of channels according to the MIMO technique.

Antennas 21-1 to 21-3 are transmitting and receiving antennas of the wireless LAN device 20 which installs the MIMO technique.

Further, the wireless LAN device 20 includes three transmitting and receiving antennas and three radio circuits and consequently can transmit/receive three multiplexed data streams. However, the number of the antennas and the radio circuits is not limited. According to the exemplary embodiment of the present invention, N which is larger than 1 (N is an integer) denotes the number of the antennas and the radio circuits in the radio communication device.

As the wireless LAN device 22 does not adopt the MIMO technique, but communicates in a form of one data stream. Furthermore, the wireless LAN device 22 includes a transmitting unit which transmits a communication mode thereof described in a preamble signal. The wireless LAN device 20 receives the preamble signal and estimates a transmission line which is connected thereto.

An antenna 23 is a transmitting and receiving antenna of the wireless LAN device 22.

Figure 3:
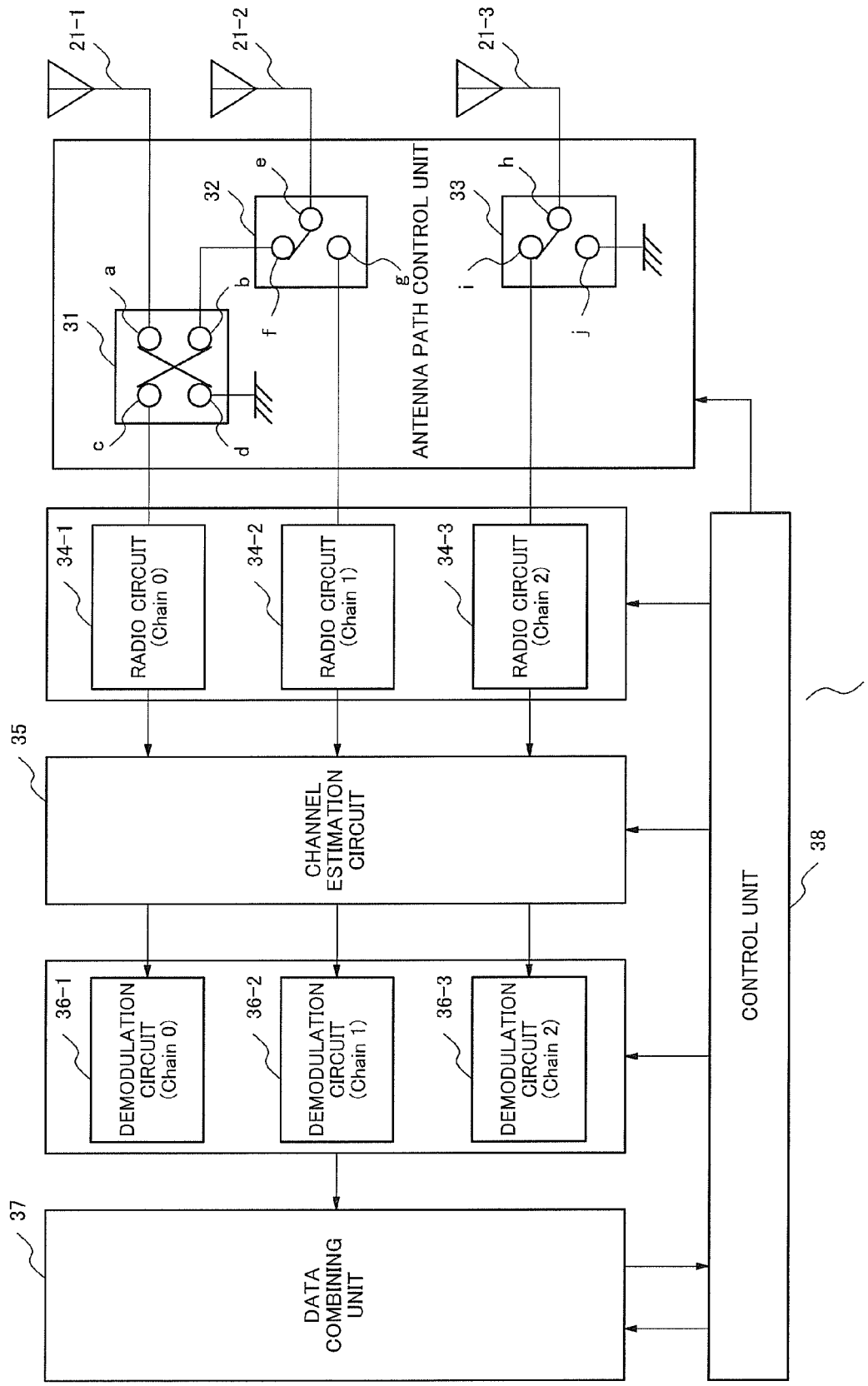
FIG. 3 is a block diagram of a wireless LAN device which communicates via a plurality of antennas according to the first exemplary embodiment of the present invention.

FIG. 3 shows an exemplary configuration of the wireless LAN device 20 according to the first exemplary embodiment of the present invention. Further, FIG. 3 shows components in a transmitting and receiving unit of the wireless LAN device 20. Moreover, the wireless LAN device 20 includes other components which are not illustrated in FIG. 3.

As shown in FIG. 3, the wireless LAN device 20 includes three transmitting antennas and three radio circuits and can transmit/receive three multiplexed data streams via three antennas.

The wireless LAN device 20 includes antennas 21-1 to 21-3, switches 31 to 33, radio circuits 34-1 to 34-3, a channel estimation circuit 35, demodulation circuits 36-1 to 36-3, a data combining unit 37 and a control unit 38.

Data is transmitted and received via the antennas 21-1 to 21-3.

The switch 31 changes a path of data which is transmitted and received via the antenna 21-1. The switch 31 includes input-output terminals a, b, c and d.

The switch 32 changes a path of data transmitted and received via the antenna 21-2. The switch 32 includes input-output terminals e, f and g.

The switch 33 changes a path of data transmitted and received via the antenna 21-3. The switch 33 includes input-output terminals h, i and j.

The radio circuits 34-1 to 34-3 are connected to the switches 31, 32 and 33 respectively. Then, the radio circuits 34-1 to 34-3 are corresponding to each path.

The channel estimation circuit 35 performs a process prior to a process demodulating signals received by antennas 21-1 to 21-3. The antennas 21-1 to 21-3 usually receive signals which have different phases and amplitudes, such as direct wave and reflected wave, due to multi-path. Since the signal is distorted consequently, the antenna cannot demodulate the signal accurately. Therefore, the channel estimation circuit 35 estimates and removes distortion of the phases and amplitudes generated over a transmission line.

The demodulation circuits 36-1 to 36-3 demodulate signals received via the antennas 21-1 to 21-3 respectively.

The data combining unit 37 combines data demodulated by each of the demodulation circuits 36-1 to 36-3.

The control unit 38 judges the following based on the preamble signal which the wireless LAN device 22 transmits. That is, the data combining unit 37 judges whether the wireless LAN device 22 is a device which communicates through combining a plurality of antennas, or an device which communicates via one antenna. When the control unit 38 judges that the wireless LAN device 22 is the device which communicates through combining a plurality of antennas, the control unit 38 controls the switches 31 to 33 to communicate through combining a plurality of antennas. When the control unit 38 judges that the wireless LAN device 22 is the device which communicates via one antenna, the control unit 38 controls the switches 31 to 33 to communicate via an antenna with a high signal level in the plurality of antennas.

Figure 4:
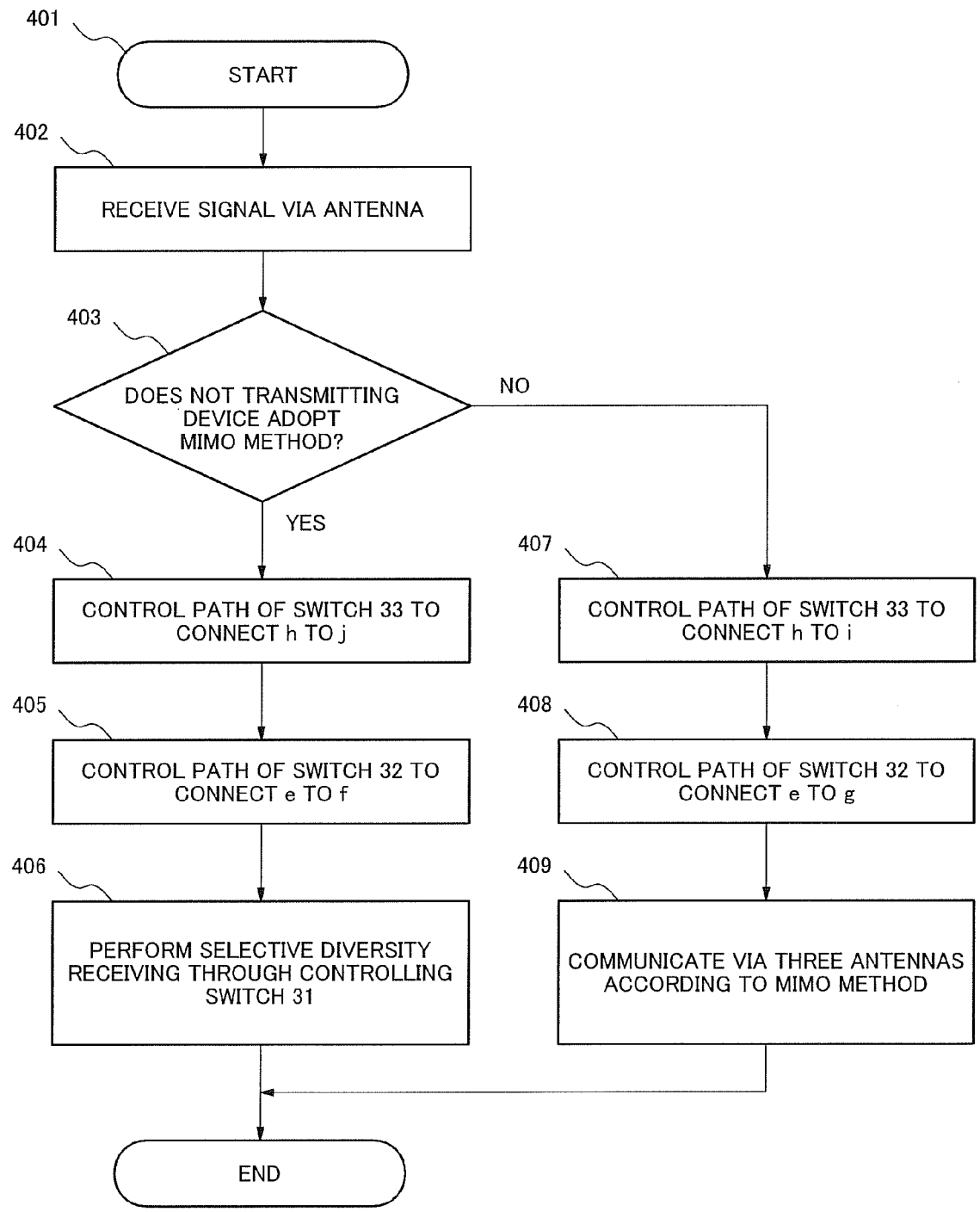
FIG. 4 is a flow chart illustrating operations according to the first exemplary embodiment of the present invention.

A transmitting and receiving operation will be described with reference to the system configuration diagram shown in FIG. 2, the configuration diagram of the wireless LAN device shown in FIG. 3 and a flowchart shown in FIG. 4 according to the exemplary embodiment of the present invention. In following descriptions, the wireless LAN device 20 which includes three antennas and three radio circuits communicates according to the MIMO technique. Moreover, the wireless LAN device 20 communicates by radio wave with the wireless LAN device 22 which communicates in the form of one data stream. Hereinafter, the wireless LAN device 20 which installs the MIMO technique operates as a communication device.

All or any of the antennas 21-1 to 21-3 receive data (402). Next, the control unit 38 judges whether or not an opposite communication device adopts the MIMO technique, based on the preamble signal added to data by a transmitting device (403). Further, the preamble signal includes information for estimating the transmission line.

Judging that the opposite communication device does not adopt the MIMO technique (Yes in 403), the control unit 38 controls the switch 33 to connect the terminal h with the terminal j and consequently connect the antenna 21-3 with GND (404). The process aims at preventing the antennas 21-1 and 21-2 from being deteriorated in transmission characteristic due to presence of the antenna 21-3.

Next, the control unit 38 controls the switch 32 which is arranged at a latter part of the antenna 21-2 to connect the terminal e with the terminal f (405).

Then, the control unit 38 controls the switch 31 to perform selective diversity receiving using the antenna 21-1 and the antenna 21-2 (406). In the selective diversity receiving process, the control unit 38 controls the switch 31 to connect the terminal a with the terminal c and connect the terminal b with the terminal d. Then the control unit 38 acquires a signal level received via the antenna 21-1. Next, the control unit 38 controls the switch 31 to connect the terminal a with the terminal d and connect the terminal b with the terminal c. Then, the control unit 38 acquires a signal level received via the antenna 21-2. The control unit 38 selects an antenna having a received signal level higher than a level of the other antenna, based on comparison of the acquired levels of the received signals. The control unit 38 communicates via the selected antenna.

Moreover, judging that the opposite communication device adopts the MIMO technique (No in 403), the control unit 38 controls the switch 33 to connect the terminal h with the terminal i and consequently connect the antenna 21-3 with the radio circuit 34-3 (407). Next, the control unit 38 controls the switch 32 to connect the terminal e with the terminal g and consequently connect the antenna 21-2 with the radio circuit 34-2 (408). The control unit 38 controls the switch 31 to connect the terminal a with the terminal c and consequently connect the antenna 21-1 with the radio circuit 34-1. Then, the control unit 38 controls transmitting and receiving processes according to the MIMO technique via three antennas (409).

Here, the transmitting and receiving process according to the MIMO technique will be described below in detail. The received signals via the antennas 21-1 to 21-3 are frequency-converted by the radio circuit 34-1 to 34-3 respectively and afterward inputted to the channel estimation circuit 35 respectively. The channel estimation circuit 35 acquires transfer functions between a transmitting antenna and a receiving antenna, based on a state of the received preamble signal added to transmitted data. Received data is separated into data streams and the data streams are demodulated by the demodulation circuits 36-1 to 36-3 respectively, based on the acquired transfer functions. Then, the data combining unit 37 combines the demodulated data and the combined data is outputted.

As mentioned above, the communication device installing the MIMO technique communicates with the communication device not installing the MIMO technique according to the exemplary embodiment of the present invention. In such case, an antenna, which is not utilized in a related art is effectively used as an antenna for the selective diversity receiving according to the exemplary embodiment of the present invention. Therefore, the present invention can provide the wireless LAN device which can improve and stabilize the transmission characteristic.

Further, in the above-mentioned description, an antenna whose received signal level is higher in the antennas 21-1 and 21-2 is selected after the antenna 21-3 is connected to GND. The selected antenna is used for communication. However, antenna with the highest signal level of the three antennas may be utilized for communication.

Next, a second exemplary embodiment of the present invention will be described below.

Figure 5:
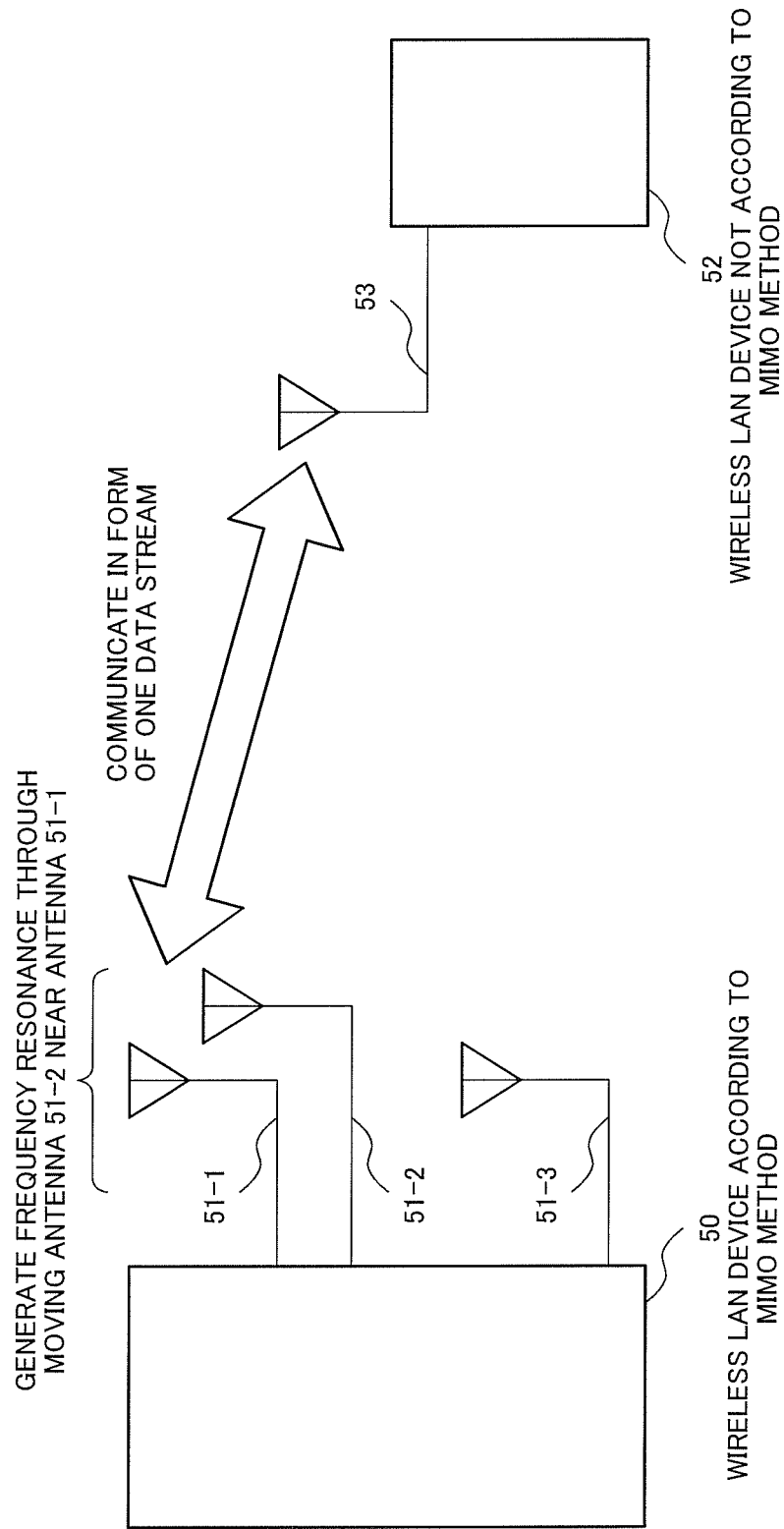
FIG. 5 is a system configuration diagram according to a second exemplary embodiment of the present invention.

As shown in FIG. 5, a radio communication system includes wireless LAN devices 50 and 52 according to the second exemplary embodiment of the present invention. Further, the radio communication system may include a plurality of wireless LAN devices. But, in following description, a configuration including the wireless LAN devices 50 and 52 is exemplified.

In FIG. 5, the wireless LAN device 50 includes three antennas and three radio circuits. The wireless LAN device 50 transmits and receives a plurality of data streams different each other through a plurality of channels respectively according to the MIMO technique.

Antennas 51-1 to 51-3 are transmitting and receiving antennas of the wireless LAN device 50 installing the MIMO technique.

Further, in the second exemplary embodiment, the wireless LAN device 50 includes three transmitting and receiving antennas and three radio circuits. However, the number of the antennas and the radio circuits is not limited. According to the second exemplary embodiment of the present invention, N which is larger than 1 (N is an integer) denotes the number of the antennas and the radio circuits in the radio communication device.

The wireless LAN device 52 does not adopt the MIMO technique, and communicates in a form of one data stream. The wireless LAN device 52 includes a transmitting unit which transmits a communication mode thereof in a preamble signal. The wireless LAN device 50 receives the preamble signal and estimates a transmission line which is connected thereto.

An antenna 53 is a transmitting and receiving antenna of the wireless LAN device 52.

Figure 6:
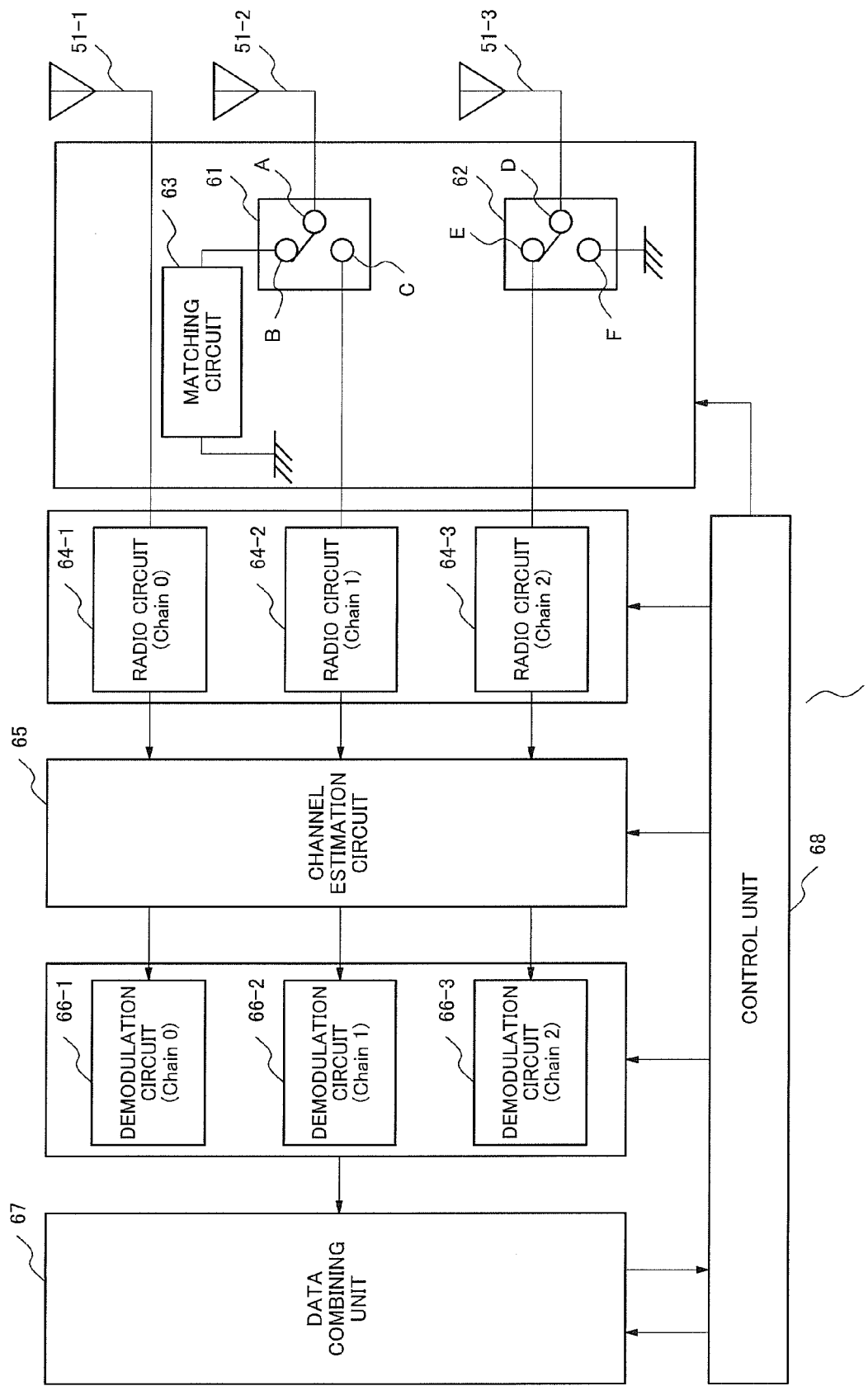
FIG. 6 is a block diagram of a wireless LAN device which communicates via a plurality of antennas according to the second exemplary embodiment of the present invention.

FIG. 6 shows an exemplary configuration of the wireless LAN device 50 according to the second exemplary embodiment of the present invention. Further, FIG. 6 shows components in a transmitting and receiving unit of the wireless LAN device 50. Moreover, the wireless LAN device 50 includes other components which are not illustrated in FIG. 6.

As shown in FIG. 6, the wireless LAN device 50 includes three transmitting and receiving antennas and three radio circuits, and can transmit and receive three multiplexed data streams via the three antennas.

The wireless LAN device 50 includes antennas 51-1 to 51-3, switches 61 and 62, a matching circuit 63, radio circuits 64-1 to 64-3, a channel estimation circuit 65, demodulation circuits 66-1 to 66-3, a data combining unit 67 and a control unit 68.

Data is transmitted and received via the antennas 51-1 to 51-3.

The switch 61 changes a path connecting the antenna 51-2 with GND via the matching circuit 63. The switch 61 includes input-output terminals A, B and C.

The switch 62 changes a pass connecting the antenna 51-3 with GND or the radio circuit 64-3. The switch 62 includes input-output terminals D, E and F.

The matching circuit 63 is adjusted so that resonance between the antenna 51-1 and the antenna 51-2 may occur when the antennas 51-1 and 51-2 are arranged at a predetermined distance. When the antenna 51-2 approaches a position at the predetermined distance from the antenna 51-1, the matching circuit 63 makes frequency resonance between the antenna 51-1 and the antenna 51-2. As a result, transmission characteristics of the antenna 51-1 improve.

The radio circuits 64-1 to 64-3, the channel estimation circuit 65, the demodulation circuits 66-1 to 66-3 and the data combining unit 67 are the same as those of the first exemplary embodiment.

The control unit 68 judges whether the wireless LAN device 52 is a device which communicates through combining a plurality of antennas, or a device which communicates via one antenna, based on the preamble signal which the wireless LAN device 52 transmits. When the wireless LAN device 52 is the device which communicates via one antenna, the control unit 68 performs control so that an antenna which is not used for communication among a plurality of antennas approaches one antenna which is used for communication, in order to make frequency resonance. The wireless LAN device 52 can stably communicate through the control mentioned above.

Figure 7:
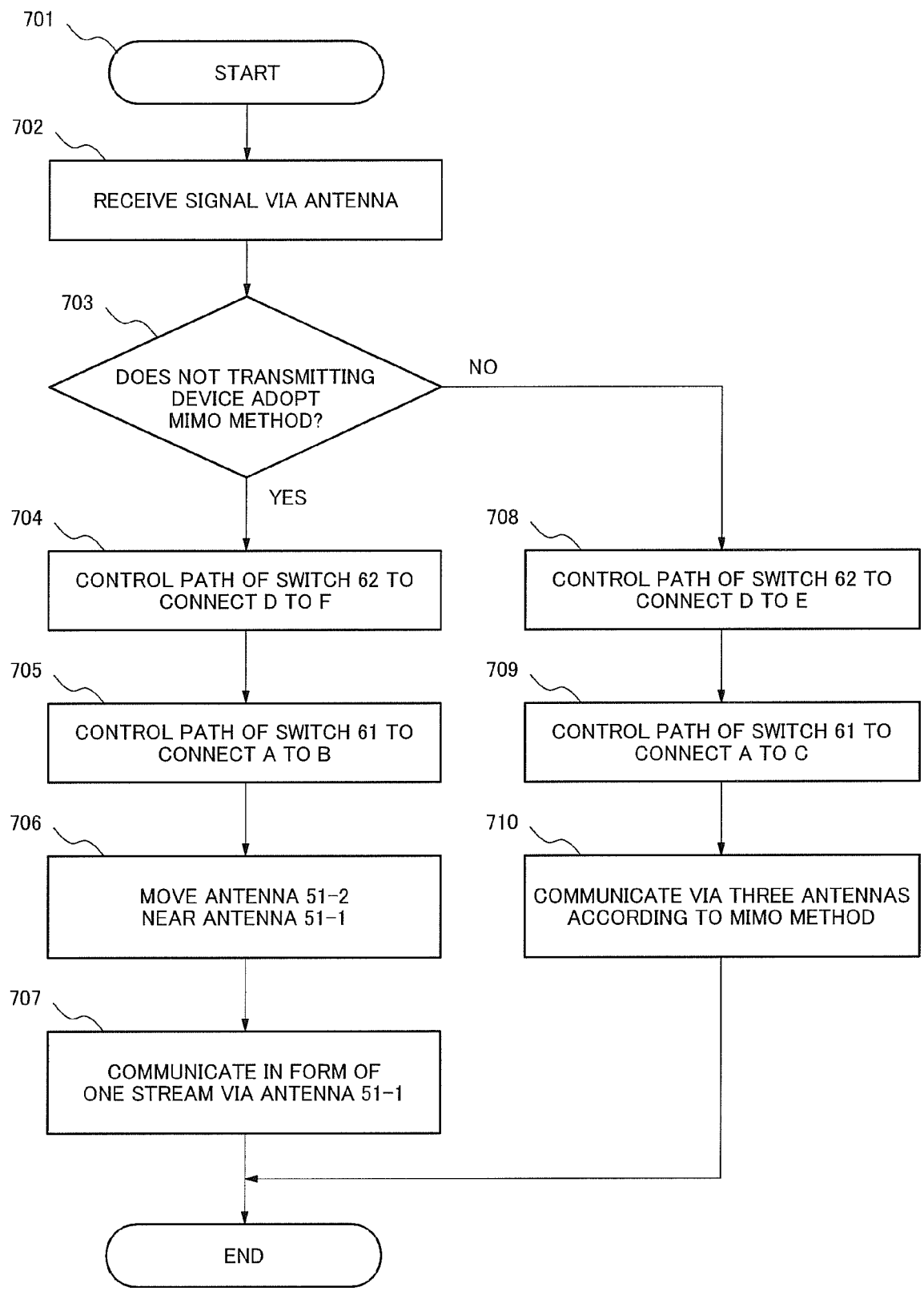
FIG. 7 is a flow chart illustrating operations according to the second exemplary embodiment of the present invention.

An operation will be described with reference to the system configuration diagram shown in FIG. 5, the configuration diagram of the wireless LAN device shown in FIG. 6 and a flowchart shown in FIG. 7 according to the exemplary embodiment of the present invention. The wireless LAN device 50 including three antennas and three radio circuits communicates with the wireless LAN device 52 in the form of one data stream via the antenna 51-1. The unused antenna 51-2 approaches a position at the predetermined distance from the antenna 51-1 which is used for communication. All or any of the antennas 51-1 to 51-3 receive data (702). Next, the control unit 68 judges whether or not an opposite communication device adopts the MIMO technique based on the preamble signal added to data by a transmitting device (703). Judging that the opposite communication device does not adopt the MIMO technique (Yes in 703), the control unit 68 controls the switch 62 to connect the terminal D with the terminal F. Then, the antenna 51-3 is connected with GND (704).

The process aims at preventing the antennas 51-1 and 51-2 from being deteriorated in transmission characteristics due to presence of the antenna 51-3.

Next, the control unit 68 controls the switch 61 to connect the terminal A with the terminal B (705). As a result, the antenna 51-2 is connected with GND via the matching circuit 63. A parameter of the matching circuit 63 is adjusted so that resonance occurs between the antenna 51-1 and the antenna 51-2 when the antennas 51-1 and 51-2 approach each other at the predetermined distance.

The antenna 51-2 moves toward the antenna 51-1 to be located at the predetermined distance therebetween (706). Then frequency resonance occurs between the antenna 51-1 and the antenna 51-2, and the transmission characteristics of antenna 51-1 improve.

Judging that the opposite communication device adopts the MIMO technique (No in 703), the control unit 68 controls the switch 62 to connect the terminal D with the terminal E. Then, the antenna 51-3 is connected with the radio circuit 64-3 (708).

Next, the control unit 68 controls the switch 61 to connect the terminal A with the terminal C. Then, the antenna 51-2 connects with the radio circuit 64-2 (709).

Then, the control unit 68 performs transmitting and receiving operations according to the MIMO technique using three antennas (710).

In an antenna switch control and an antenna configuration, a communication device having the MIMO technique communicates with a communication device which does not adopt the MIMO technique. An antenna which is not used according to a related art is effectively used according to the exemplary embodiment of the present invention. Moreover, frequency resonance between two antennas occurs. As a result, it is possible to provide a radio communication device which can widen frequency bandwidth of an antenna and can improve transmission characteristics of the antenna according to the exemplary embodiment of the present invention. Further, being applied to an antenna, the present invention can be effective in a transmitting operation. In the wireless LAN device, a distance between the antennas can be adjusted to the predetermined distance according to the exemplary embodiment of the present invention.

Figure 8:
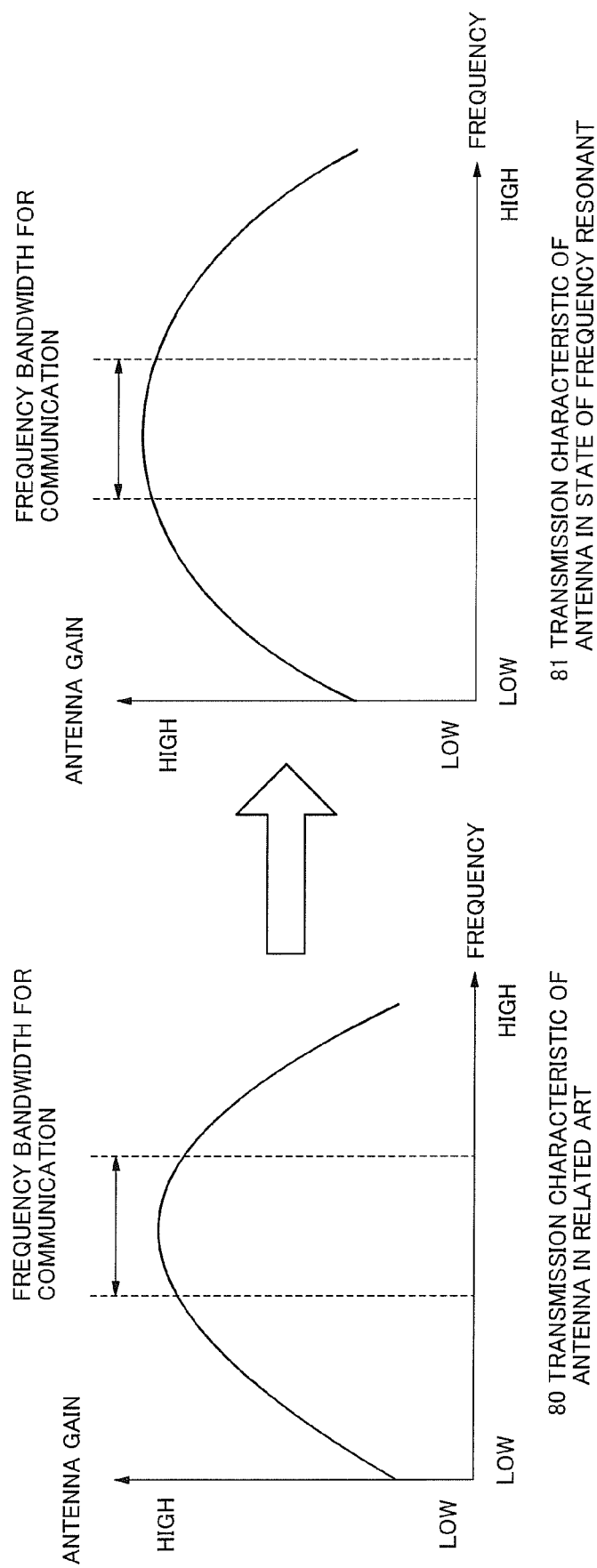
FIG. 8 is a schematic diagram showing an effect of improvement of transmission characteristics in a frequency domain according to the exemplary embodiments of the present invention.

FIG. 8 is a schematic diagram showing frequency characteristics improvement of an antenna and showing effect of the frequency characteristic improvement. 80 in FIG. 8 is a schematic diagram showing frequency characteristics of an antenna in a related art. 81 in FIG. 8 is a schematic diagram showing frequency characteristics of antenna in a state of frequency resonance. Vertical axes in the diagram indicate antenna gain, and an upper part thereof indicates better antenna gain than that of a lower part thereof. Horizontal axes in the diagram indicate frequency, and a right part thereof indicates higher frequency than that of a left part thereof. The figure indicates that with regard to frequency bandwidth at high antenna gain, a bandwidth of an antenna having frequency resonance is wider than that of an antenna in a related art. Moreover, the antenna having frequency resonance includes small fluctuation in the antenna gain, when the frequency band indicated by dotted line in the diagram is used for communication.

Further, in the above-mentioned description, the MIMO technique is described as a method for communicating in the form of multi data streams. Other methods which enable communication in the form of multi data streams may be applied to the present invention. Combination of the first exemplary embodiment and second exemplary embodiment is possible.

A function of the control unit can be formed not only by hardware but also by computer program. In the computer program, a processor, which works on the basis of the computer program stored in a program memory, performs the same function and operation as those of the exemplary embodiment mentioned above. Further, the computer program may perform a part of functions of the exemplary embodiment mentioned above.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

Further, it is the inventor's intention to retain all equivalents of the claimed invention even if the claims are amended during prosecution.

What is claimed is:

1. A radio communication device, comprising:
a plurality antennas; and
a communication unit which communicates through combining a plurality of antennas when an opposite radio communication device is a radio communication device which communicates through combining a plurality of antennas, and communicates through one antenna among said plurality of antennas when said opposite radio communication device is a radio communication device which communicates via one antenna,
wherein said control unit moves an antenna which is not used for communication among said plurality of antennas toward said one antenna used for communication to generate frequency resonance.

2. The radio communication device according to claim 1, further comprising:
a matching circuit which is connected to said antenna unused for communication to generate said frequency resonance.

3. A radio communication system, comprising:
a first radio communication device which transmits information on a communication mode thereof; and
a second radio communication device which communicates through combining a plurality of antennas upon receiving information indicating that a radio communication device which communicates through combining a plurality of antennas transmits said information, and communicates through one antenna among said plurality of antennas upon receiving information indicating that a radio communication device which communicates via one antenna transmits said information,
wherein said second radio communication device moves an antenna which is not used for communication among said plurality of antennas toward said one antenna used for communication to generate frequency resonance.

4. The radio communication system according to claim 3, wherein said second radio communication device includes a matching circuit which is connected to said antenna which is not used for communication to generate said frequency resonance.

5. A method for communication of a radio communication device which communicates through combining a plurality of antennas, comprising:
judging whether or not an opposite radio communication device is a radio communication device which communicates via one antenna; and
communicating through combining a plurality of antennas when said opposite radio communication device is a radio communication device which communicates through combining a plurality of antennas, and communicates through one antenna among said plurality of antennas when said opposite radio communication device is a radio communication device which communicates via said one antenna,
wherein communication is performed through moving said an antenna which is not used for communication among said plurality of antennas toward said one antenna used for communication to generate frequency resonance.

6. The method for communication according to claim 5, wherein said radio communication device includes a matching circuit, which is connected to said unused antenna to generate said frequency resonance.

* * * * *